United States Patent [19]

Haraldsson et al.

[11] Patent Number: 4,517,211

[45] Date of Patent: May 14, 1985

[54] METHOD FOR THE PRODUCTION OF CONCENTRATED, FROZEN POTATO PUREE

[75] Inventors: Roland Haraldsson, Bromölla; Jan Bengtsson, Hässleholm; Claes Friberg, Monopolvägen, all of Sweden

[73] Assignee: Fjalkinge Potato Processing Machinery AB, Hassleholm, Sweden

[21] Appl. No.: 462,193

[22] Filed: Jan. 31, 1983

[30] Foreign Application Priority Data

Feb. 5, 1982 [SE] Sweden .............................. 8200664

[51] Int. Cl.$^3$ ............................................. A23L 1/216
[52] U.S. Cl. .................................. 426/444; 426/464; 426/637
[58] Field of Search ............... 426/637, 456, 464, 524, 426/444, 518

[56] References Cited

U.S. PATENT DOCUMENTS 2,564,296 8/1951 Bostock .............................. 426/464

FOREIGN PATENT DOCUMENTS 498941 1/1973 U.S.S.R. .............................. 426/637
561549 6/1977 U.S.S.R. .............................. 426/637
799710 2/1981 U.S.S.R. .............................. 426/637

OTHER PUBLICATIONS

Talburt, William F. et al., "Potato Processing" (Third Ed.), Westport, Connecticut 1975, pp. 434, 435, 438.

Primary Examiner—Arthur L. Corbin
Attorney, Agent, or Firm—Staas & Halsey

[57] ABSTRACT

A method for the production of concentrated, frozen puree, especially potato puree, in which method the potatoes are first washed, peeled, cut into pieces, blanched, cooled and dewatered. The potatoes thus processed are then dried to reduce their weight by 40-60%, whereupon the potatoes are steamed and then mashed, frozen and crushed. By drying the potatoes before they are steamed, a final product of higher quality is obtained, while at the same time chemical additives, such as antioxidants, consistency agents etc., are rendered superfluous.

5 Claims, 1 Drawing Figure

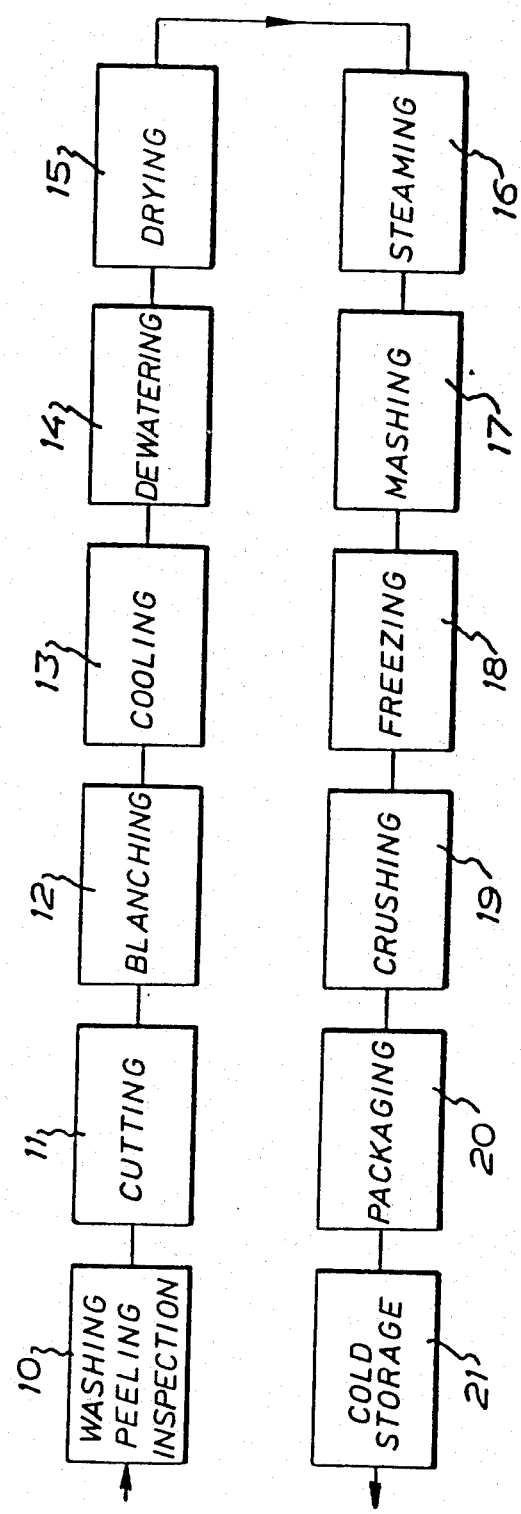

METHOD FOR THE PRODUCTION OF CONCENTRATED, FROZEN POTATO PUREE

BACKGROUND OF THE INVENTION

The present invention relates to a method for the production of concentrated, frozen potatoe puree, in which method the potatoes are washed, peeled, cut into pieces, such as cubes, blanched, cooled, dewatered and treated prior to final processing which comprises mashing, freezing and crushing.

In the conventional production of concentrated frozen potatoe, puree, the potatoes are steamed after they have been washed, peeled, cut into pieces, blanched, cooled and dewatered, whereupon the potatoes are dried, mashed, frozen and crushed. The result of this treatment is a final product which is not entirely satisfactory because of its tendency towards stickiness and lump formation. It has long been endeavoured to modify the production process in such a manner that these shortcomings will be eliminated, but so far without success.

SUMMARY OF THE INVENTION

The present invention has for its object to produce a better potatoe puree which is highly similar to home-made potatoe puree. To this end, the treatment step prior to the final processing of the potatoes resides in that the potatoes are first dried so that their weight is reduced by 40-60%, whereupon the potatoes are steamed and then mashed.

By this simple procedure, the above-mentioned shortcomings are avoided, and furthermore chemical additives, such as antioxidants, consistency agents etc., can be dispensed with.

BRIEF DESCRIPTION OF THE DRAWING

The drawing is a block diagram illustrating an example of the method of the present invention.

DESCRIPTION OF THE PREFERRED EMBODIMENT

The invention will be described in detail in the following, reference being had to the accompanying drawing which illustrates an example of the invention in the form of a block diagram.

The potatoes from which a concentrated, frozen potato puree is to be produced, are supplied to an input step 10 in which the potatoes are washed and peeled in conventional manner, for instance by steam peeling or carborundum peeling, and inspected. In the following step 11, the potatoes are cut, preferably into cubes of 10×10×10 mm, although other dimensions and shapes are of course possible. In the next step 12, the potatoes are blanched in a screw-type water blancher at a temperature of 80°-85° C. and for a period of 12 min. In step 13, the potatoes are cooled in a screw-type water cooler for 10-14 min. and at a water temperature of 12° C. In the dewatering step 14, the surface water on the potatoes is removed by means of a vibrator having a fine-mesh screen.

In conventional plants, the potatoes are steamed after dewatering, but in the method according to the present invention the potatoes are instead dried in step 15 by means of a conveyor dryer having one or more conveyor belts and a number of zones for alternating the direction of the air flow. The drying time and the drying temperature depend upon the raw material and the manner in which the potatoes are cut. If, in accordance with what has been said above, the potatoes are cut into cubes of 10×10×10 mm, the drying time will amount to 20-30 min. at a temperature of 100° C. After drying, the potatoes are steamed in step 16. Steaming is accomplished on a belt conveyor where no condensate is allowed to drip onto the product. Steaming normally is conducted for 30-40 min. and is conducted with saturated steam of 100° C. The steamed potatoes are then mashed in step 17 by pressing them through an apertured disc, which is done immediately before the freezing step 18 by allowing the mashed potatoes to drop directly onto the freezing conveyor. The product preferably is placed in porous strands on the freezing conveyor, and cold air is passed through the potatoe strands from below. The potatoes in the slightly frozen together strands are then crushed in a suitable crusher in step 19, whereupon packaging is effected in step 20, and the packaged potatoes are conveyed to a cold storage 21.

The simple procedure of drying the potatoes before they are steamed brings the advantage that mashing can be affected in a far simpler manner, for instance by means of a simple, slightly modified mincing machine, and without obtaining a sticky product. Above all, however, the texture of the final product will be far better than by present-day techniques, and the tendency towards stickiness and lump formation is reduced considerably. Effecting the steaming operation at a later stage than in conventional technique also brings hygienic advantages.

Although the present invention is concerned primarily with the production of potatoe puree, it is also applicable to the production of purees of other root crops.

What we claim and desire to secure by Letters Patent is:

1. A method for the production of concentrated, frozen potatoe puree from potatoes, the method comprising the sequential steps of: washing the potatoes; peeling the potatoes; cutting the potatoes into pieces; blanching the potatoes; cooling the potatoes; dewatering the potatoes; drying the potatoes to reduce the weight of the potatoes by approximately 40-60%; steaming the potatoes; mashing the potatoes; freezing the potatoes; and then crushing the potatoes;

2. A method as claimed in claim 1, wherein the potatoes are cut into cubes of 10×10×10 mm., and wherein the potatoes are dried for approximately 20-30 min. at a temperature of approximately 100° C.

3. A method as claimed in claim 2, wherein the potatoes are steamed for approximately 30-40 min. in saturated steam having a temperature of approximately 100° C.

4. A method as claimed in claim 1, wherein the potatoes are steamed for approximately 30-40 min. in saturated steam having a temperature of approximately 100° C.

5. A method for the production of concentrated frozen puree from a root crop, the method comprising the sequential steps of:
   (a) washing the root crop;
   (b) peeling the root crop;
   (c) cutting the root crop;
   (d) blanching the root crop;
   (e) cooling the root crop;
   (f) dewatering the root crop;
   (g) drying the root crop to reduce the weight of the root crop treated in steps (a)-(f) by approximately 40-60%;
   (h) steaming the root crop;
   (i) mashing the root crop;
   (j) freezing the root crop; and then
   (k) crushing the root crop.

* * * * *